United States Patent [19]

Ninke

[11] 3,953,672
[45] Apr. 27, 1976

[54] GRAY SCALE FOR PLANAR GAS DISCHARGE DISPLAY DEVICES

[75] Inventor: William Herbert Ninke, Holmdel, N.J.

[73] Assignee: Bell Telephone Laboratories, Incorporated, Murray Hill, N.J.

[22] Filed: Nov. 4, 1974

[21] Appl. No.: 520,612

[52] U.S. Cl. ............................ 178/7.3 D; 313/188; 315/169 TV; 358/59
[51] Int. Cl.² ........................................ H04N 5/44
[58] Field of Search ............. 358/59, 56; 178/7.3 D; 315/169 TV; 313/188; 340/324 M

[56] References Cited
UNITED STATES PATENTS

| | | | |
|---|---|---|---|
| 3,733,435 | 5/1973 | Chodil | 315/169 TV |
| 3,771,008 | 11/1973 | Chen et al. | 178/7.3 D |
| 3,798,502 | 3/1974 | Ngo | 315/169 TV |
| 3,821,721 | 6/1974 | Hughes | 315/169 TV |
| 3,838,209 | 9/1974 | Tsuchiya | 178/7.3 D |
| 3,839,713 | 10/1974 | Urade et al. | 178/7.3 D |
| 3,839,715 | 10/1974 | Andoh | 315/169 TV |
| 3,866,209 | 2/1975 | Weimer | 178/7.3 D |

Primary Examiner—Howard W. Britton
Assistant Examiner—Michael A. Masinick
Attorney, Agent, or Firm—W. Ryan

[57] ABSTRACT

A two-dimensional planar display device includes a plurality of plasma discharge shift registers positioned along rows of a display matrix. Each resolution element along a row includes two stable discharge locations, a first of which is optically masked. Modulating the duration of propagation signals associated with the second discharge location, the duration for propagation signals for the entire resolution element being constant, permits the generation of continuously variable brightness levels. In a preferred embodiment, glow discharges propagating down an additional one or more column shift registers are sequentially coupled to row shift registers to permit rapid scanning over the entire two-dimensional array.

10 Claims, 6 Drawing Figures

GRAY SCALE FOR PLANAR GAS DISCHARGE DISPLAY DEVICES

BACKGROUND OF THE INVENTION

1. Field of the Invention

The present invention relates to display devices, and more particularly to plasma discharge display devices. Still more particularly, the present invention relates to apparatus and methods for generating one- and two-dimensional scanned plasma discharge displays having continuously variable brightness levels.

2. Prior Art

Recent years have witnessed the greatly increased use of arrays of plasma discharge devices for generating data displays. For example, U.S. Pat. No. 3,559,190 issued to D. L. Bitzer et al. on Jan. 26, 1971 and U.S. Pat. No. 3,499,167 issued to T. C. Baker et al. on Mar. 3, 1970 illustrate a typical form of plasma display device, commonly called the plasma panel. Standard plasma panel configurations include a matrix array of plasma cells defined by the overlap of respective pluralities of horizontal and vertical (row and column) electrodes. By using standard half-select addressing techniques, it is possible to write or erase any particular plasma cell. The advantages of such plasma panel systems follow in large part from the self-memory characteristic of the plasma cells. Thus, while information-bearing signals are necessary to write and erase information in particular cells, no additional information is required to maintain a display once established. Rather, only periodic non-information-bearing sustain signals are required.

One disadvantage of the most common plasma panel configurations is that, in general, it is possible only to display binary information, i.e., "on" or "off" conditions of plasma cells. Thus, the potential for displaying information of varying intensity such as might be associated with standard television displays, has not generally been realized using standard plasma panels.

Some attempts have, however, been made to generate gray level displays using modified arrangements of standard plasma panel structures. For example, Ngo, "A Multiple Intensity Plasma Display with Internal Memory," Proceedings of the S.I.D., Vol. 13, No. 1, first quarter 1972, pages 21–25 illustrates one technique for generating gray scale in a plasma panel system. See also, U.S. Pat. No. 3,626,241 issued Dec. 7, 1971 to Ngo. The complexity involved in generating the multiple images described in the last-mentioned paper is, however, not justified in many applications. Thus, for example, approximately 50 percent more drive circuitry (as compared with standard panels) is typically required for the gray scale plasma panel system described in the above-cited Ngo paper. When it is considered that a major objection to present two-level (on-off) plasma panels is the need for rather complex drive circuitry, it can be appreciated that any additional complexity will be tolerated only with great reluctance.

Other attempts to introduce gray scale operation of a plasma panel include that described in U.S. Pat. No. 3,735,182 issued May 22, 1973 to J. J. Dalton, et al. which requires additional conductor patterns, each having a different resolution. U.S. Pat. No. 3,742,483 issued June 26, 1973 to J. A. Ogle; U.S. Pat. No. 3,654,388 issued Apr. 4, 1972 to H. G. Slottow, et al.; and U.S. Pat. No. 3,778,673 issued Dec. 11, 1973 to M. E. Eisenberg, et al. describe a plasma panel including means for modulating the amplitude and/or duration of cell current, thereby varying cell brightness. Each of these described systems requires at least a degree of complexity in panel fabrication and drive circuitry equal to that for bilevel (on/off) plasma panels.

While much emphasis has been placed in prior art plasma panel systems on the matrix arrangement of rows and columns of individual plasma cells, some effort has been directed to producing more integral structures. Thus, for example, in U.S. Pat. No. 3,781,600 issued Dec. 25, 1973 to W. E. Coleman et al., there is described a plasma device for transferring a discharge linearly along a prescribed path, i.e., in a manner analogous to transferring signals representative of digital information in a linear shift register. The structure described in the Coleman et al. patent has been generalized to a two-dimensional structure as described in U.S. Pat. No. 3,775,764 issued Nov. 27, 1973 to J. P. Gauer. Another plasma discharge shifting device is described in U.S. Pat. No. 3,795,908 issued Mar. 5, 1974 to A. W. McDowell et al.

The structure described in the last-mentioned Coleman et al., Gauer, and McDowell et al. patents will be seen to share with plasma panels of the type described in the earlier-mentioned Bitzer et al. and Baker et al. patents, the characteristic of individual pluralities of location-defining electrodes positioned on opposite sides of a cavity containing an illuminable inert gas. One important limitation of all such two-sided structures is the need for accurate registration of cell-defining electrodes to ensure the establishment and/or transfer of a discharge at the respective cells. If rather close tolerances in physical structure are not observed, undue burdens are placed on the requirements for the various drive and sustain signals. Inability to reliably reproduce physical structure and electrical characteristics of various of the plasma devices using the multi-level "sandwich" panel construction has resulted in low manufacturing yield and attendant high cost.

One solution for improving the reproducibility of structures for realizing plasma discharge sites is described in U.S. Pat. Nos. 3,646,384, 3,666,981, and 3,719,940 issued to F. M. Lay on Feb. 29, 1972, May 30, 1972, and Mar. 6, 1973, respectively. The structure described in the Lay patents is essentially planar, thereby avoiding many of the alignment and registration problems inherent in sandwich-type panels. An improved version of the single substrate configuration is described in U.S. patent application Ser. No. 444,380 filed Feb. 21, 1974 by G. W. Dick et al. The structure described in the Dick et al. application and the various Lay patents is also characterized by selection of particular cells by coincident current techniques.

In U.S. Pat. No. 3,798,502 issued to P. D. Ngo on Mar. 19, 1974 (hereinafter the '502 patent), there is disclosed a planar gas discharge shift register having simplified gas cell definition and greatly facilitated discharge transfer characteristics. Copending U.S. patent applications by P. D. Ngo, Ser. No. 520,613 entitled "Plasma Discharge Shift Registers," and Ser. No. 520,614 entitled "Planar Raster Scan Display Having Gas Discharge Shift Registers," both filed of even date herewith (hereinafter the Ngo applications) describe further modifications to the invention covered by the '502 patent. To simplify the present disclosure, both the '502 patent and the Ngo applications are hereby incorporated by reference in the present application.

While improved plasma shift register structures are disclosed in the '502 patent and the Ngo applications, only the last-cited Ngo application provides explicitly for a two-dimensional interconnection to provide TV-like displays. Further, only the same last-cited Ngo application teaches the incorporation in a shift register structure of a gray scale capability such as is required for standard television or similar displays.

It is therefore an object of the present invention to provide a shift register-based display system capable of generating and maintaining one- and two-dimensional images.

It is a further object of the present invention to provide such a display system having a gray scale capability.

SUMMARY OF THE INVENTION

The present invention, in preferred embodiment, includes a plurality of plasma discharge shift registers, each of the general type described in the '502 patent and the Ngo applications. Advantageously, each of these shift registers is aligned with a first coordinate in an orthogonal coordinate system, e.g., a row of a rectangular matrix. Another gas discharge shift register is advantageously positioned along a second orthogonal coordinate direction adjacent one end of the shift registers aligned with the first coordinate direction. Thus, for example, if it is assumed that each of the first plurality of shift registers defines a row in a rectangular matrix, then the second shift register may be considered to be positioned along a column defining the leftmost or rightmost extremity of the matrix. The number of stable discharge sites along the column shift register is chosen to be equal to twice the number of rows in the matrix. Further, selected ones of the stable discharge sites in the column shift register are arranged to be positioned with respect to each row in the matrix such that a discharge transfer may be effected from the column shift register to the adjacent location in a row shift register.

By initiating a discharge at one extremity of the column shift register and by causing this discharge to propagate along the length of the column shift register while also being successively transferred to each row shift register, the discharge is scanned over the entire display matrix. The period for shifting from a stable location in the column shift register adjacent a row shift register to the following stable location in the column shift register adjacent a row shift register is advantageously chosen to be equal to the period required to shift a discharge along an entire row shift register. Appropriate clock signals are applied to each of the row shift registers and the column shift register to effect the desired transfer and propagation.

Each pair of cells along a row shift register is considered a single resolution element in the display array. A first cell in each such pair is optically masked from view, while the second is available for viewing. By modulating the proportion of time that a scanning discharge is permitted to remain at a visible cell as compared with a masked cell, while keeping the total time for scanning a cell pair constant, the brightness of the viewable discharge is effectively modulated. The time modulation of a cell pair is advantageously accomplished in response to an applied video signal.

Alternative scanning arrangements based on the above principles and incorporating the time modulation feature are described in the following detailed description.

DETAILED DESCRIPTION

Figure 1:
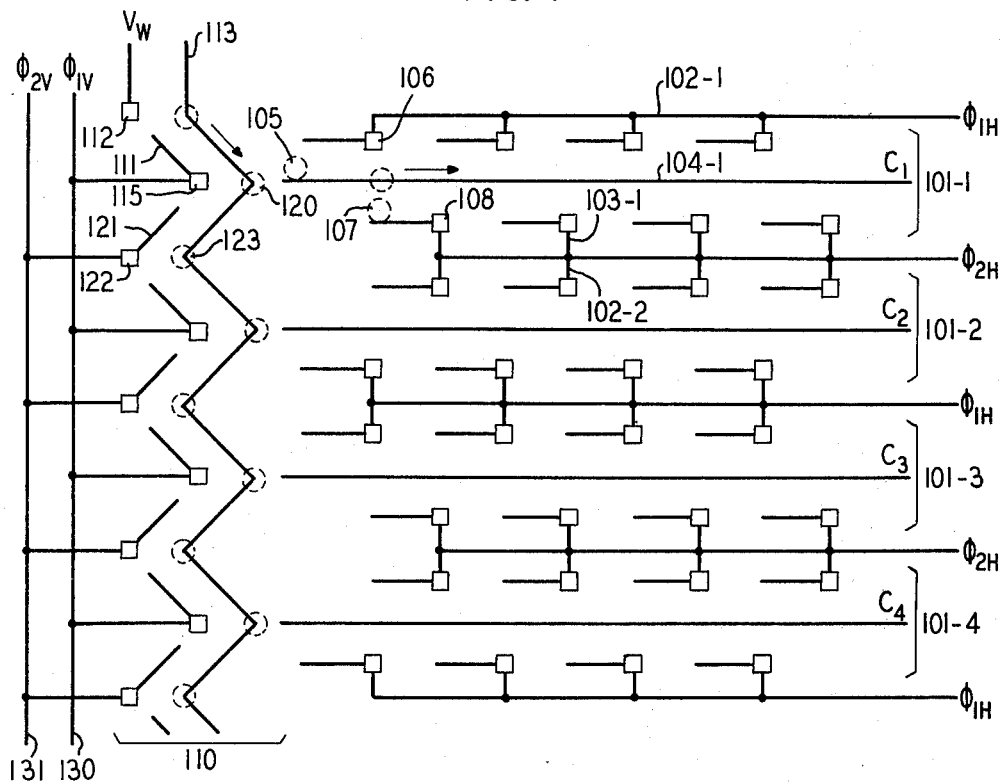
FIG. 1 shows a two-dimensional array of plasma discharge shift registers used in a preferred embodiment of the present invention.

FIG. 1 shows the basic overall structure of a two-dimensional shift register display included in a preferred embodiment of the present invention. In particular, FIG. 1 shows a plurality of shift registers $101\text{-}i$, $i = 1, 2, \ldots, N$, each of which is advantageously of the type illustrated in FIG. 3 of the '502 patent. For purposes of illustration only, N is taken to be 4 in FIG. 1. There is included in the ith shift register a first anode $102\text{-}i$, a second anode $103\text{-}i$ and a cathode $104\text{-}i$.

As will be appreciated from the incorporated '502 patent and Ngo applications, a glow discharge occurring at the extreme left of shift register $101\text{-}i$, i.e., at the position defined by the glow 105, will be propagated in step-by-step fashion from left to right in FIG. 1 to successive stable positions defined by the anode protuberances such as 106. The points on anode 102-1 like that immediately above the glow 105 are conveniently referred to in the '502 patent, e.g., as pick-up tips, and the positions such as 106 are referred to as the stable discharge sites. The actual structure corresponding to these features is described in greater detail in the '502 patent. By applying suitable clock signals as described in the '502 patent and the Ngo application, a glow passes initially from a pick-up site such as 105 to a stable site such as that associated with anode element 106. During subsequent clock cycles the discharge at site 106 is advantageously transferred to a pick-up site like 107, thence to a stable site like 108.

In such fashion, it is clear that the left to right propagation of a plasma discharge is achieved along shift register 101-1 in FIG. 1 by alternating between one or the other of the anodes 102-1 and 103-1 and the common cathode 104-1. The overall effect on the glow discharge is one of zigzagging above and below the cathode 104-1 while traversing a left to right general direction. Because the anodes $102\text{-}i$ and $103\text{-}i$ are advantageously positioned in close proximity to the cathode $104\text{-}i$, it is not in general possible for the unaided eye to see the up-down component of the motion in the gas discharge propagation.

To simplify interconnections to the anodes for successive rows, it has been found desirable to use a single anode input to connect to the upper anode of a shift register $101\text{-}(i + 1)$ and the lower anode of a shift register $101\text{-}i$. Thus, for example, the anode 103-1 is advantageously joined on a single clock bus with anode 102-2.

Also shown in FIG. 1 is a vertical shift register 110 having 2N stable positions. The configuration chosen for the shift register 110 is advantageously of the general type identified in FIG. 1 of the '502 patent. A principal distinguishing characteristic of the shift register 110 as contrasted with the shift registers 101-$i$ is that the shift register 110 has anodes on only one side of its cathode, 113, while the registers 101-$i$ have anodes on both sides of cathode 104-$i$. The effect of this unilateral anode positioning in shift register 110 is to confine the glow discharge to a more or less constant distance from cathode 113. No zigzagging to positions on alternate sides of cathode 113, like that associated with shift registers 101-$i$, occurs in shift register 110.

While the functioning of shift register 110 is substantially identical to that shown in FIG. 1 of the '502 patent, the exact shape and positioning of the electrodes will be seen to have been changed. For reasons that will become apparent in the description below, the cathode 113 has been formed in a sawtooth shape, with stable state locations, e.g., 120 or 123, occurring at the "tooth" extremeties. Stable discharge location 120 and other alternate stable locations are arranged to be adjacent respective cathodes 104-$i$ of shift registers 101-$i$.

The anodes for the shift register 110 are again segmented into two pluralities of pick-up tips and associated stable discharge location elements. A first plurality of pick-up tips and stable discharge sites are connected to a first anode bus 130 for connection to $\Phi_{1V}$ clock signals having the form shown in FIG. 2. The remaining pick-up tips and stable location sites are connected to a second anode bus 131 for connection to $\Phi_{2V}$ clock signals, also shown in FIG. 2.

In operation, pick-up tip 111 is arranged to receive a glow discharge resulting from the application of a write signal $V_w$ (having the form shown in FIG. 2) at write anode 112. The glow discharge between anode 112 and the uppermost portion of cathode 113 remains for the duration of the positive $V_w$ pulse and permits, by the well-known glow priming mechanism, the establishment of a glow discharge between the pick-up tip 111 and cathode 113 during the immediately following interval. The glow discharge received at pick-up tip 111 is, according with the teachings of the '502 patent and the Ngo applications, caused to propagate along cathode 113 to a first stable location to the right of position 115 on anode 130 of shift register 110. The discharge 120 between cathode 113 and anode position 115 is also advantageously positioned such that it may, by the application of appropriate potentials, be attracted by the pick-up tip adjacent discharge site 105, thereby to cause a glow to originate at site 105 at the extreme left of shift register 101-1.

Anode position 115 is therefore seen to function, in part, in substantially the same manner as a standard write element. The transfer of a glow discharge from one shift register to another is discussed further in the Ngo applications. It will be appreciated from the '502 patent and the Ngo applications that the glow transfer occurs in large part because of the priming effect caused by the discharge at the "transferor" location. That is, the discharge at location 120 gives rise to a localized atmosphere of photoelectrons and other charged particles which serve to prime a discharge at the pick-up tip adjacent location 105. When normal propagation potentials are applied in the presence of such priming between the pick-up tip adjacent location 105 and cathode 104-1, a discharge is realized between these latter two elements. The priming, or transferor, discharge is, of course, uneffected by the newly created discharge at the "transferee" site, i.e., two discharges, the original and the transferred discharge, are present after a transfer is accomplished. In practical realizations, it proves convenient to pass the glow discharge to a new location in the column shift register 110 concurrently with a transfer to a row shift register 101-$i$ as reflected by the clock pulse timing shown in FIG. 2. This is similar to the time relation between the write pulse and the propagation clock pulses in FIG. 2 of the '502 patent.

During subsequent column clock pulse intervals, then, the glow at site 120 is caused to pass by way of pick-up tip 121 adjacent stable discharge location 122 on anode 131, and the corresponding position 123 adjacent cathode 113. This latter propagation increment is, of course, accomplished in response to the application of the $\Phi_{2V}$ signals shown in FIG. 2. The discharge location 123 defined by anode position 122 and the adjacent position on cathode 113 is not sufficiently close to any of the pick-up tips at the leftmost extremities of the shift registers 101-$i$ to encourage or prime a breakdown at any of these latter pick-up tips. Accordingly, no transfer from the vertical shift register 110 to one of the horizontal shift registers 101-$i$ is accomplished while the glow discharge is at one of the positions defined by a leftmost tip of the cathode 113, i.e., while at a location like 123.

Figure 2:
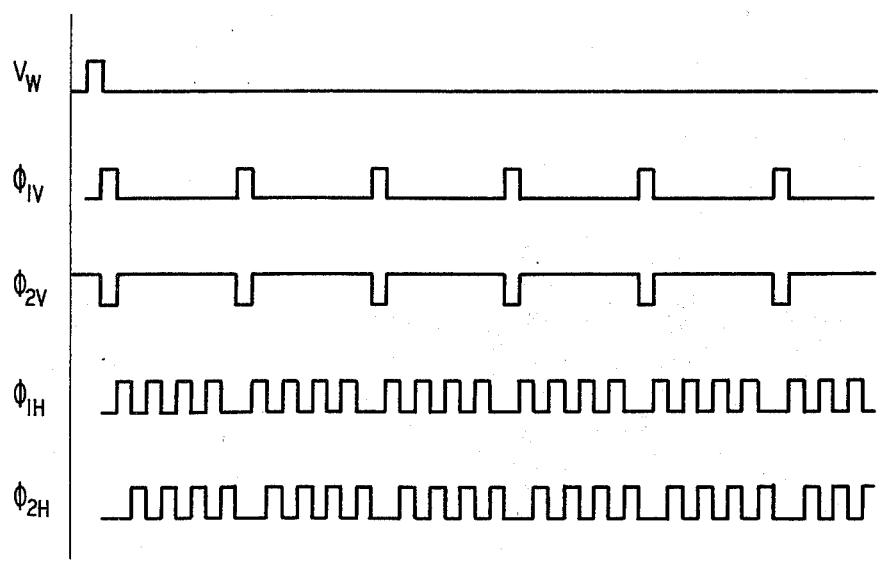
FIG. 2 shows clock signals useful for causing a glow discharge to be scanned over the display matrix of FIG. 1.

While the glow discharge in the vertical shift register 110 is at one of the last-mentioned positions, clock signals applied to the shift registers 101-$i$ cause a glow discharge established at a leftmost pick-up tip to be propagated in a left-to-right fashion along the shift registers 101-$i$. Waveforms designated $\Phi_{1H}$ and $\Phi_{2H}$ in FIG. 2 are suitable for this purpose. Note that the horizontal propagation signals, $\Phi_{1H}$ and $\Phi_{2H}$, alternate 8 times during the time between the beginnings of the respective vertical propagation signals, $\Phi_{2V}$ and $\Phi_{1V}$. This relation between the repetition rates follows simply from the fact that 8 stable discharge locations per line have been assumed. In general, the horizontal rate will be L times faster than the vertical rate when there are L stable discharge locations per lines.

As should be clear from the foregoing description, there is no benefit gained from having the glow discharge remain at a rightmost stable location such as 120 in the vertical shift register 110 for any but a brief transition period. Thus, the $\Phi_{1V}$ waveform in FIG. 2 may assume the form of a short positive pulse to create the discharge suitable to effect the glow transfer to one of the row (horizontal) shift registers 101-$i$. The longer positive pulses included in the $\Phi_{2V}$ waveform are suitable for moving the discharge in the column shift register 110 to a position like 123, which is more remote from the registers 101-$i$. The duration of a discharge at a rightmost location of shift register 110 need only extend for one row shift register clock period. This sequence of column clock pulses and the related horizontal register clock pulse sequences are summarized in FIG. 2. As in the case of the shift registers in the '502 patent and the Ngo applications, a glow propagated to the extreme right of one of the shift registers 101-$i$ will be self extinguishing.

The actual drive circuits for supplying the various clock pulse sequences are well known in the art. In general, those pulse sources used to drive prior art d-c plasma displays are suitable, when gated in accordance with the signals in FIG. 2, for application to the various electrodes shown in FIG. 1.

The above descriptions permit one skilled in the art to generate a two-dimensional display featuring a scanned light pulse which appears first at the upper lefthand corner and proceeds initially to the upper righthand corner. This left-to-right scan continues on a line-by-line basis until the glow discharge reaches the lower righthand corner. Through the application of another write pulse at the write electrode 112, the entire process is repeated.

To produce a variable intensity image using any light pulse scanning system, it is, of course, necessary to modulate the light in some manner corresponding to an information-bearing signal. In standard cathode ray tube television systems, e.g., the intensity of the scanning electron beam is appropriately modulated in response to a received video signal. The varying beam intensity, in turn, varies the brightness of light signals resulting from the bombardment of phosphor coatings inside the tube envelope. Such CRT-based display systems permit scanning light signals having a range of brightness levels varying continuously from zero to maximum brightness.

In a scanning light pulse system like that shown in FIG. 1 and described above, each cell (except the last one in each row) must experience a glow discharge if the scanning operation is to continue. That is, a cell at a given location must provide a gas breakdown, with its associated priming effect, if the cell to the immediate right of the given cell is to experience a discharge. It is possible, however, to vary the duration of a discharge at a given location, provided only that the discharge remains at each stable discharge location long enough and with sufficient intensity to provide the desired priming effect for the immediately following cell.

Figure 3:
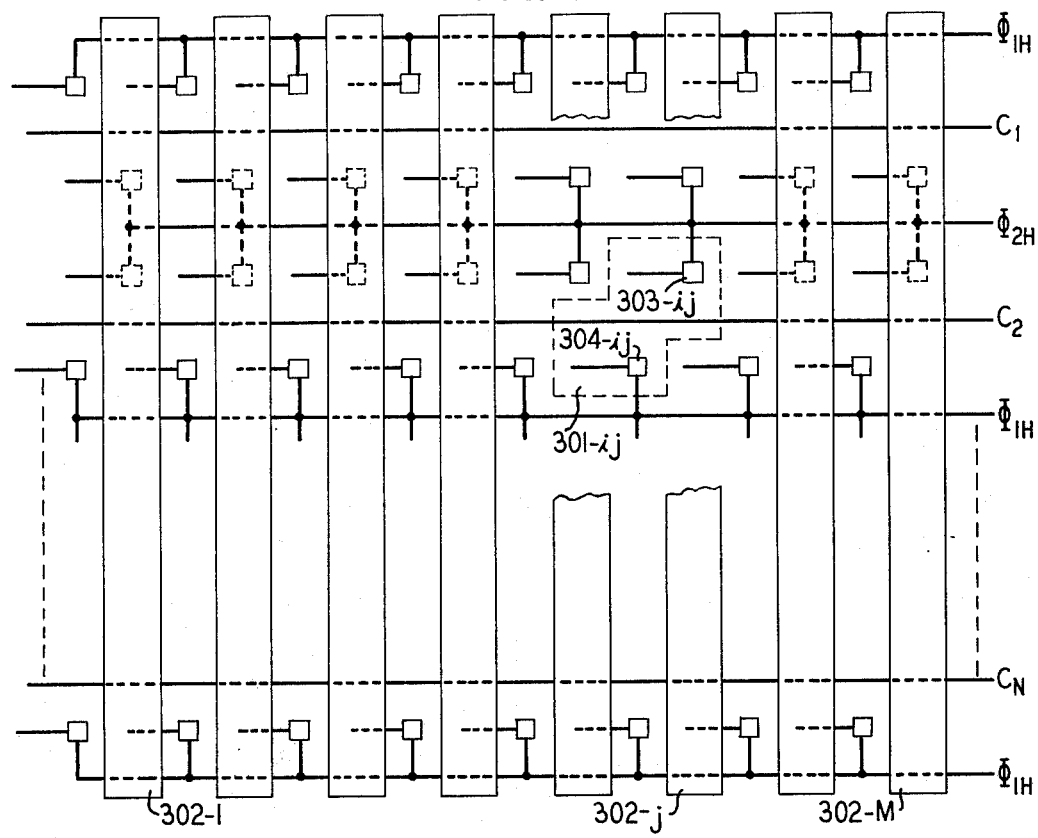
FIG. 3 illustrates the manner in which alternate display sites are masked in accordance with one embodiment of the present invention.

FIG. 3 illustrates modifications to the shift register structure of FIG. 1 to permit variable intensity images to be displayed. For simplicity the column scanning shift register (substantially identical to that shown in FIG. 1) has been omitted in FIG. 3. Along the $i$th row, $i = 1, 2, \ldots, N$, in FIG. 3, pairs of consecutive discharge locations such as 301-$ij$ in FIG. 3 are considered as single resolution elements. Further, one of the locations in each resolution element is optically masked from view. Thus a mask element 302-$j$ overlays one cell in each cell pair in the $j$th column of resolution elements. In FIG. 3, mask element 302-$j$ completely obscures the glow discharge at the locations 303-$ij$ for $i = 1, 2, \ldots, N$. The leftmost locations 304-$ij$ remain visible to an observer, however.

Figure 4:
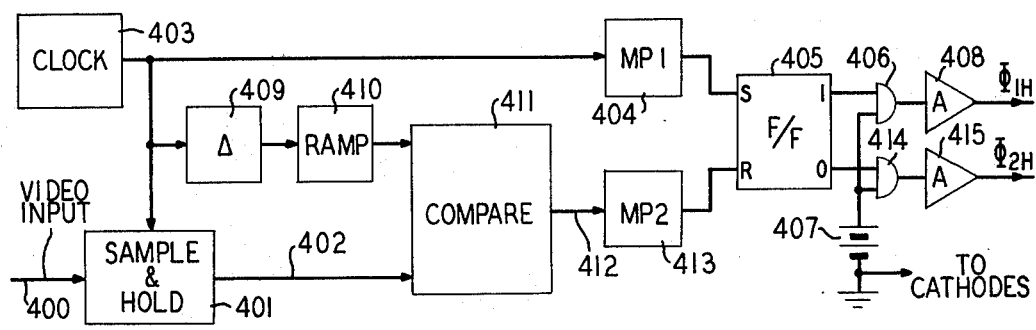
FIG. 4 shows a circuit for time modulating propagation signals used in connection with the structure of FIGS. 1 and 3.

FIG. 4 shows a circuit useful in controlling clock signals to the shift register structure of FIG. 3 to effect the propagation of a scanning glow discharge along a particular row, while also varying the duration of a glow at individual discharge sites. The variation in duration of a discharge at individual discharge locations gives an impression to a viewer of a corresponding variable intensity scanning low discharge. The circuitry of FIG. 4 is intended to so modify the propagation signals $\Phi_{1H}$ and $\Phi_{2H}$ to proportionately vary the time at which a propagating discharge occurs at an unmasked location 304-$ij$ in a resolution cell as compared with the duration of a discharge at the associated masked location 303-$ij$. The overall period for propagating from resolution element to resolution element along a given row is, however, maintained constant to permit simplified interface with input video signals.

Figure 5:
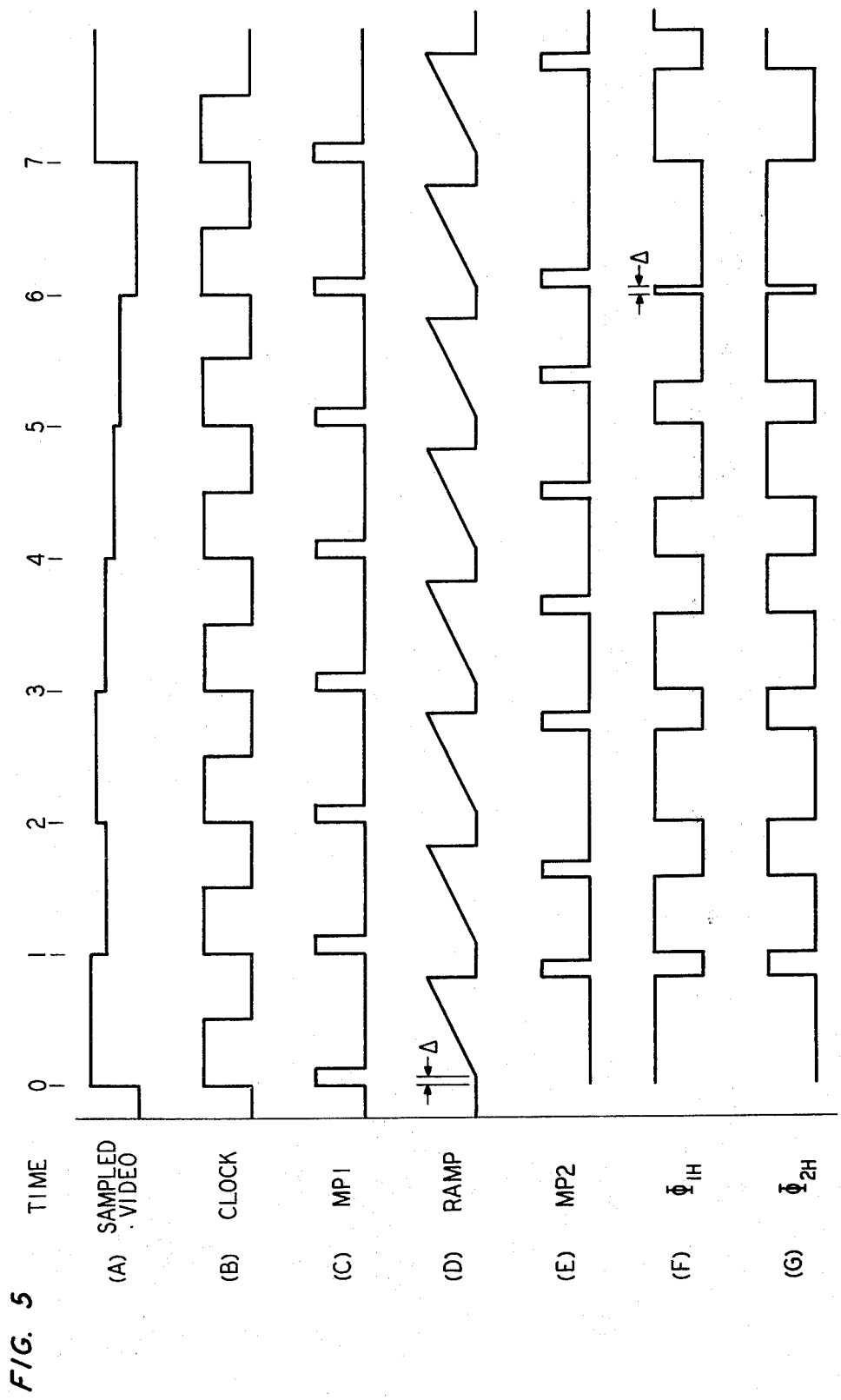
FIG. 5 illustrates various waveforms associated with the circuitry of FIG. 4.

The operation of the circuitry of FIG. 4 will be traced, assuming an 8-resolution element row. An input video signal appearing on lead 400, after being sampled by sample and hold circuit 401, causes a signal like that shown in line (A) in FIG. 5 to appear at lead 402. Clock signals derived from clock circuit 403 and having the configuration shown in line (B) in FIG. 5 are applied to a monopulser or 1-shot circuit 404 to generate pulses like those shown on line (C) in FIG. 5. These latter pulses then cause flip-flop 405 to be established in the set or 1 condition. When flip-flop 405 is in the 1 condition, AND gate 406 permits a positive level signal from battery 407 to be gated to amplifier 408 and in turn, to the anodes requiring the $\Phi_{1H}$ signal. Clock circuit 403 is also advantageously applied to ramp generator circuit 410 after a delay introduced by delay unit 409. Thus the clock circuit 403 causes a ramp signal like that shown on line (D) in FIG. 5 to be generated.

Comparator 411 compares the level of signals generated by ramp generator 410 and the output from sample and hold circuit 401 to generate an output signal on lead 412 whenever the levels of the two compared signals are equal. When such equality is determined the compare signal on lead 412 causes 1-shot circuit 413 to generate an output pulse of the form shown in FIG. 5 on line (E). It will be noted that the timing of this pulse relative to the beginning of the ramp signal is proportional to the magnitude of the sampled input video signal.

The output from monopulser 413 causes flip-flop 405 to be established in the reset or 0 state. This condition, in turn, causes the signal from battery 407 to be gated by way of AND gate 414 to amplifier 415 and, in turn, to the $\Phi_{2H}$ anodes. This condition persists until the beginning of the next clock period, at which time clock circuit 403 again applies an input signal at monopulser 404 which reestablishes flip-flop 405 in the set condition.

It will be seen that the effect of the above sequence of operations is to cause a glow to appear and be maintained at the discharge location associated with the $\Phi_{1H}$ signal of duration proportional to the amplitude of the input signal applied on lead 400. The duration of the glow at locations corresponding to the $\Phi_{2H}$ signal is merely the difference between the period of clock signals generated by clock 403 and the duration of the glow appearing at the $\Phi_{1H}$ discharge locations. Since the glow at the $\Phi_{2H}$ locations is not available for viewing, the duration, and hence the brightness, of this discharge is of no moment.

During subsequent cycles, as shown in FIG. 5, the sampled video signal having the arbitrary levels appearing on line (A) causes discharge durations on the $\Phi_{1H}$ locations as shown in line (F) in FIG. 5.

The delay unit 409 shown in FIG. 4 causes the ramp generator 410 to respond to the clock signals from clock 403 by generating the delayed ramp signal shown in FIG. 5, line (D). That is, the ramp signal is arranged to begin only after an interval of length $\Delta$ seconds has passed following the beginning of a clock cycle. This $\Delta$-second interval is chosen to be equal to the minimum period for which a stable discharge is required to ensure further propagation along a row shift register. Thus when the input video level is at the zero level (as indicated in the time interval from $t = 6$ to $t = 7$ in FIG. 5, line (A), the visible glow at the resolution element corresponding to the then-current time slot will last for only Δ seconds before being passed along to the masked location in the resolution element. This Δ-second discharge results, finally, from the Δ-second positive level for the $\Phi_{1H}$ propagation signal shown in the $t = 6$ to $t = 7$ time slot on line (F) in FIG. 5.

The value for Δ can be chosen to be quite small, corresponding to a light pulse of very short duration. To the unaided eye, this minimum duration light pulse is of such short duration that it appears non-existent, or nearly so. The dynamic range for light values therefore extends substantially from that for a Δ-second light pulse per scan to that for a (T-Δ)-second light pulse, where T is the sample rate for the input video signal, i.e., the period for the clock 403 in FIG. 4. The maximum duration for the visible light pulse follows from the fact that the masked cell must be on for at least Δ seconds to permit continued propagation. A limiting operation may profitably precede the sampling function if there is any danger of the input video signal exceeding a level corresponding to the (T-Δ)-second period.

The scanning of a discharge in row-by-row fashion while experiencing time-duration modulation as described above will be recognized as equivalent in many respects to standard CRT-based television display generation. Thus by synchronizing a video signal with the scan over a 2-dimensional array like that shown in FIG. 1 (modified in the manner shown in FIG. 3), a continuously variable-intensity (gray scale) image is readily formed. The only synchronizing signals required are frame sync signals conveniently appended to the input video signal in standard form, i.e., like vertical sync pulses in standard television signals. These frame sync signals are used to initiate (write) a discharge at the top of the column shift register, e.g., 110 in FIG. 1. Because of the inherent stability of the row-by-row selection provided by column shift register 110, no external row (horizontal) sync pulses are required in the present invention.

While the masking elements shown as 302-$j$ in FIG. 3 have been shown as vertical lines or bars, more localized marks are equally appropriate. Thus individual opaque spots may be deposited on the glass or other envelope enclosing the arrays shown in FIGS. 1 and 3 and described above. These individual spots or other masks can as well be deposited on the inside of such envelope or other covering. If the substrate on which the individual row shift registers are formed should be made of transparent materials, as well as the register structure, the masks can as well be placed on the reverse side of the substrate.

Though the above description has contemplated a display which is intended to be viewed directly, other materials and/or structures may be interposed between the scanned array and the viewer. Thus, for example, various phosphors can be deposited on the display envelope or other support in close proximity to an unmasked discharge site. Such phosphors will be stimulated by the ion flux associated with a glow discharge to give off light of a hue characteristic of the phosphor and an intensity related to the duration of the scanned discharge.

While the emphasis in the preceding discussion has been placed on 2-dimensional arrays of shift registers, it should be clear that many will find application for individual shift registers having resolution elements of the type described above. Further, such individual registers having intensity modulation as described will find application in many areas. Thus, for example, a single shift register can be arbitrarily divided into linear segments, with each segment being associated with a process variable or other physical parameter. The intensity of brightness can be controlled by a video signal derived in straightforward fashion from monitoring the physical process, thereby to give readily observed indications of relative values for the monitored process variables.

While rows including a relatively small number of discharge locations have been used by way of example, any reasonable number of locations can be included in a row. When a large number of locations is included in each row, and/or the number of rows is large, it proves convenient to segment the rows into S subsets, each of which is associated with a separate column shift register. Thus S rows are scanned simultaneously, one in each set.

Figure 6:
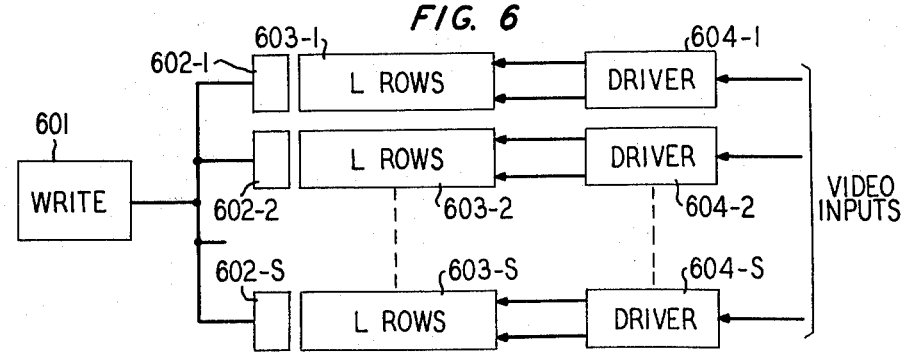
FIG. 6 illustrates modifications to the panel structure of FIGS. 1 and 3, and the circuits of FIG. 4 to permit faster scanning rates to be achieved.

FIG. 6 illustrates a system based on the above general method of operation. A write (vertical sync) signal is applied by write circuit 601 to each of S column shift registers 602-$i$, $i = 1,2, \ldots S$, each having 2L stable discharge locations. Each of these latter shift registers is coupled in the manner described above to a respective set of L row shift registers 603-$i$, $i = 1,2, \ldots S$. The row shift registers then propagate a received glow discharge from left to right under the control of respective drivers 604-$i$, $i = 1,2, \ldots S$. These drivers are, in turn, modulated in the manner shown in FIG. 4 by input video signals. Since each L-row subset displays only a portion of the image to appear on the panel viewing surface, only information corresponding to that portion of an image is supplied to the associated driver. That is, the input video signal must be segmented, with each segment corresponding to a part of an image being applied as modulation signals to a part of the panel. Thus a total of S circuits like that shown in FIG. 4 are used. The clock circuit 403, the one-shot circuit 404, the delay unit 409 and ramp generator 410 can, however be shared among all S of these circuits.

In the extreme case, each row in a 2-dimensional matrix can be considered a subset in the sense decribed above. In such cases, no column shift register is required; instead, a separate segmented video signal is applied to a drive circuit associated with each line.

While a resolution element has been defined above as comprising 2 stable discharge locations, it is clear that a resolution element can in appropriate cases include 3 or more stable discharge locations. Propagation signals are then generated having a number of phases equal to the number of stable locations per resolution element. Each phase is then time-duration modulated in accordance with the principles and practices described above, and one or more locations in a resolution element can be masked as above.

An interesting application of a 3- or 4-location resolution element of the type described is one for generating color television images. Thus by placing a phosphor associated with each of three primary colors adjacent respective locations in a resolution element, and by time modulating the glow discharge at each location, an arbitrarily colored light signal can be generated at each resolution element. A fourth stable discharge location may be used in a masked condition to permit easier arbitrary color specification. The individual locations in a 3- or 4-location resolution cell may be arranged in other than straight linear positions to permit better mixing of colors from the individual glows. For example, a zig-zag (sawtooth) structure of the type used in the column shift register 110 in FIG. 1 may be used, or one of the multiphase structures described in the above-cited patent application by Ngo filed of even date herewith, Ser. No. 520,613, entitled "Plasma Discharge Shift Registers," may be used to advantage.

It should be understood that the designations "row" and "column" are arbitrary. The actual orientation of the individual shift registers is largely irrelevent, except that in appropriate cases, shift register locations are advantageously juxtaposed to permit glow coupling. While rectangular arrays are natural in many applications, other orthogonal and non-orthogonal arrangements may be advantageous. For example a "column" shift register such as 110 in FIG. 1 can be formed into a circular "hub", with individual "row" shift registers coupled to individual hub locations and extending therefrom in the manner of spokes on a wheel.

What is claimed is:

1. A graphical display system comprising
at least one plasma discharge shift register having LM ordered stable discharge locations, consecutive sets of L of said locations defining individual resolution elements,
means for initiating a glow discharge at a first discharge location in each of said shift registers,
means for propagating a glow discharge through successive locations in said shift registers, said means for propagating comprising means for time modulating said propagation so that a discharge is maintained at one or more discharge locations in a resolution element for a controlled period relative to that at which a glow is maintained at the remaining locations in that resolution element.

2. Apparatus according to claim 1 wherein $L = 2$.

3. Apparatus according to claim 1 wherein said at least one shift register comprises N shift registers arranged along rows of a 2-dimensional array, and wherein said means for initiating a glow discharge comprises at least one column shift register having a total of at least N stable locations, said column shift registers being positioned perpendicularly with respect to said N shift registers, with each of said N locations in said column shift registers adjacent a first location in respective ones of said N row shift registers, whereby glows propagating along said column shift registers are non-destructively coupled to said N shift registers.

4. Apparatus according to claim 3 wherein said column shift registers comprise a total of 2N stable locations, alternate ones of which are not adjacent said row shift registers, said apparatus further comprising column propagation means for propagating a glow discharge along each of said column shift registers, said column propagating means comprising means for maintaining a glow discharge at each of said alternate ones of said stable locations for a period substantially equal to the time required to propagate a glow discharge through all resolution elements in one of said row shift registers.

5. Apparatus according to claim 1 further comprising means for optically masking glows at predetermined ones of said stable locations in each of said resolution elements.

6. Apparatus according to claim 5 wherein said means for propagating comprises means responsive to applied video signals for controlling the relative duration of glow discharges at locations within given resolution elements which are not masked relative to the duration of glow discharges at one or more associated locations within said given resolution elements which are masked, thereby to give rise to a light pulse scanned over non-masked locations having a relative brightness corresponding to said appplied video signal.

7. Apparatus according to claim 6 wherein the number of stable discharge locations in each resolution element is 2, and wherein the number of unmasked stable discharge locations in each resolution element is 1.

8. Apparatus according to claim 1 further comprising a quantity of phosphor material adjacent selected ones of said stable discharge locations, whereby a light signal is generated at each of said selected locations having a hue characteristic of the phosphor material at the respective locations and a brightness related to the duration of the glow at said selected ones of said locations.

9. Apparatus according to claim 8 wherein each of said resolution elements comprises 3 locations, and wherein each of said 3 locations in each resolution element includes a quantity of a phosphor material associated with a different primary color.

10. Apparatus according to claim 9 wherein each of said resolution elements comprises a fourth stable discharge location, which fourth location is optically masked from view.

* * * * *